Dec. 27, 1966     H. S. FIELD     3,295,035

CONTROL SYSTEM FOR UNIVERSAL MOTORS

Filed March 15, 1963

INVENTOR.
HAROLD S. FIELD
BY
*Kenyon & Kenyon*
ATTORNEYS

United States Patent Office

3,295,035
Patented Dec. 27, 1966

3,295,035
CONTROL SYSTEM FOR UNIVERSAL MOTORS
Harold S. Field, Tulsa, Okla., assignor to Geophysical Research Corporation, New York, N.Y., a corporation of New Jersey
Filed Mar. 15, 1963, Ser. No. 265,466
4 Claims. (Cl. 318—245)

This invention relates to electrical motors and more particularly to a method for adjusting and controlling the speed and direction of motors of the "universal" type, that is, adapted to operate on both alternating and direct current circuits.

Figure 1:
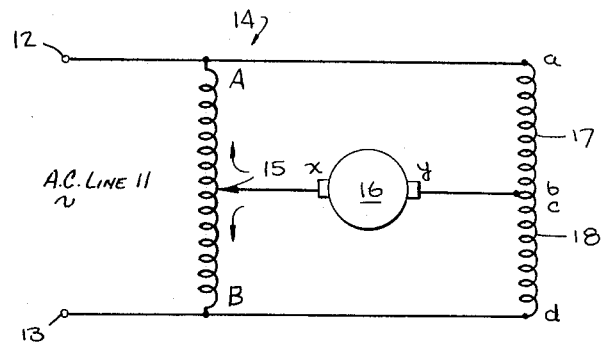
Figure 2:
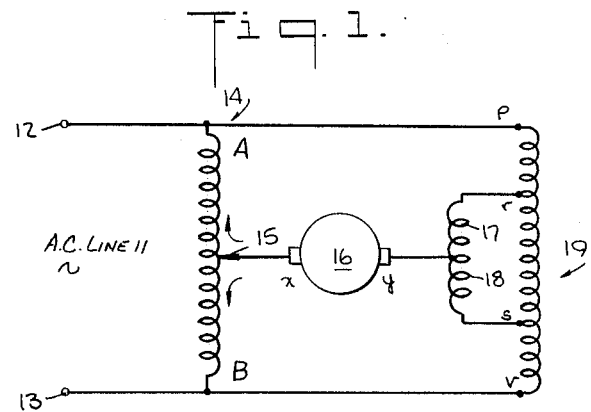
Figure 3:
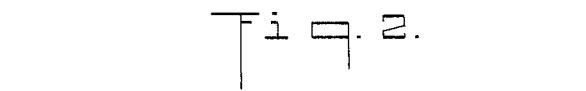

The principal object of this invention is to provide a circuit arrangement for a universal motor which will permit continuously variable speed and variable direction operation of this motor from an alternating current line and which will yield desirable torque characteristics at all speeds. Other objects and features of the invention will become apparent upon reading the following description and referring to the attached drawings in which:

FIG. 1 is a schematic representation of a preferred arrangement for a motor control system according to the invention, and FIG. 2 and FIG. 3 show modifications of this arrangement.

Alternating current energy is provided by any suitable source 11 to the fixed terminals 12 and 13 of an autotransformer 14 with a variable terminal 15. The universal motor which is to be controlled is of the commutator type, and is normally provided with two field windings 17 and 18 having terminals $a$ and $b$, and $c$ and $d$ respectively, and an armature 16 having terminals $x$ and $y$.

In accordance with the invention, these field windings are connected in series aiding across the entire A.C. line, as shown in FIG. 1. Alternatively, a continuous field winding having a tap at its center may be used.

One terminal of universal motor armature 16, is connected through the brushes to the common tap, $bc$, of the two field windings in series. The second terminal of motor armature 16 is connected to the variable terminal 15 of the autotransformer 14.

If the line voltage is too high for field windings 17 and 18 to be placed across the entire line, the arrangement shown in FIG. 2 may be used. In the latter arrangement, a second autotransformer 19 with several taps, $p, r, s, v$, is placed across the line and an appropriate lesser voltage is applied to the field windings 17 and 18, as shown in FIG. 2.

A third arrangement is shown in FIG. 3, which permits reduction of the voltage applied to variable autotransformer 14, having taps $p, q, r, s, t$, and $v$.

According to this arrangement, the voltage source 11 may be applied to the outer taps $p$ and $v$ of autotransformer 19. Terminals 12 and 13 of autotransformer 14 are connected to taps $q$ and $r$ of autotransformer 19. In all other respects, the connections shown in FIG. 3 are identical to those in the arrangement of FIG. 2.

In operation, the direction and speed of the motor are controlled by the position of variable terminal 15 of the autotransformer. It may be seen that, in the balanced arrangement of FIG. 1, departure of terminal 15 from the center point results in flow of current through the motor armature accompanied by an increase in the speed of the motor.

It is also seen that such departure above and below the center point permits control of the direction of the motor, for the polarity of the applied voltage and consequently the direction of armature current with respect to the field current may thus be controlled.

For example, if the terminal 15 is moved in direction A from the center point, armature current will flow from terminal 15 to tap $bc$.

On the other hand, if terminal 15 is moved in direction B from the center point, phase of the armature current will reverse and flow from tap $bc$ to terminal 15.

This phase reversal of the armature current, without change in the phase of the field current, results in the desired change of direction of rotation.

It is further seen that this arrangement has the advantages of a cumulative compound field winding regardless of motor direction, and that with increased load the field current is supported in part by the armature current, resulting in desirable speed and torque characteristics. The armature current will be fairly constant at all speeds since the back electromotive force generated by the rotation of the armature subtracts from the voltage applied to the armature terminals. The torque developed is proportional to armature current and to the flux density produced by the field windings and so remains fairly constant at all speeds, for constant load. As the load increases, the armature current increases and the flux increases thus adjusting the torque to the load.

What is claimed is:

1. A control system for a variable speed variable direction alternating current motor comprising a first autotransformer having a variable terminal, a second autotransformer in shunt with said first autotransformer, a universal motor having two field windings connected in series with one another and supplied by said second autotransformer, one armature terminal of said motor being connected to the variable terminal of said first autotransformer and the second armature terminal of said motor being connected to the junction point of said windings, whereby the direction and the speed of the motor is controlled by the positioning of said variable terminal.

2. A control system for a variable speed variable direction alternating current motor comprising means for applying a driving voltage, a universal motor having a tapped field winding, a first autotransformer having a variable terminal, a second autotransformer, means for applying said driving voltage across said second autotransformer, means for applying a portion of the voltage across said second autotransformer to said first autotransformer, means for applying a portion of the voltage across said first autotransformer across said field winding, said motor having one armature terminal connected to said variable terminal, said motor having its other armature terminal connected to the tap point on said winding, whereby the direction and the speed of the motor is controlled by the positioning of said variable terminal.

3. In a system for controlling the speed and the direction of a universal motor having an armature and having at least two field windings connected in series with one another, the junction point of said field windings being connected to one terminal of the armature, the combination comprising a first autotransformer for connection across a source of potential, said first autotransformer having a variable terminal for connection to the other terminal of the armature, a second autotransformer for connection across the serially connected field windings, said second autotransformer being connected in shunt with said first transformer, whereby the direction and the speed of the motor is controlled by the positioning of said variable terminal.

4. In a system for controlling the speed and the direction of a universal motor having an armature and having at least two field windings connected in series with one another, the junction point of said field windings being connected to one terminal of the armature, the combination comprising a first autotransformer having a variable terminal for connection to the other terminal of the armature, a second autotransformer for connection across a source of potential and for connection of at least a portion of said second autotransformer being connected across said first autotransformer, whereby the direction and the speed of the motor is controlled by the positioning of said variable terminal.

References Cited by the Examiner

UNITED STATES PATENTS

| 295,454 | 3/1884 | Sprague | 318—257 |
| 841,257 | 1/1907 | Latour | 318—244 |
| 1,667,647 | 4/1928 | Alexanderson | 318—244 |
| 2,192,050 | 2/1940 | Norcross | 318—244 |

ORIS L. RADER, *Primary Examiner.*

C. E. ROHRER, G. Z. RUBINSON, *Assistant Examiners.*